March 15, 1960   H. E. LONNGREN   2,928,184
SULFATE LIQUOR RECOVERY PROCESS
Filed May 24, 1956
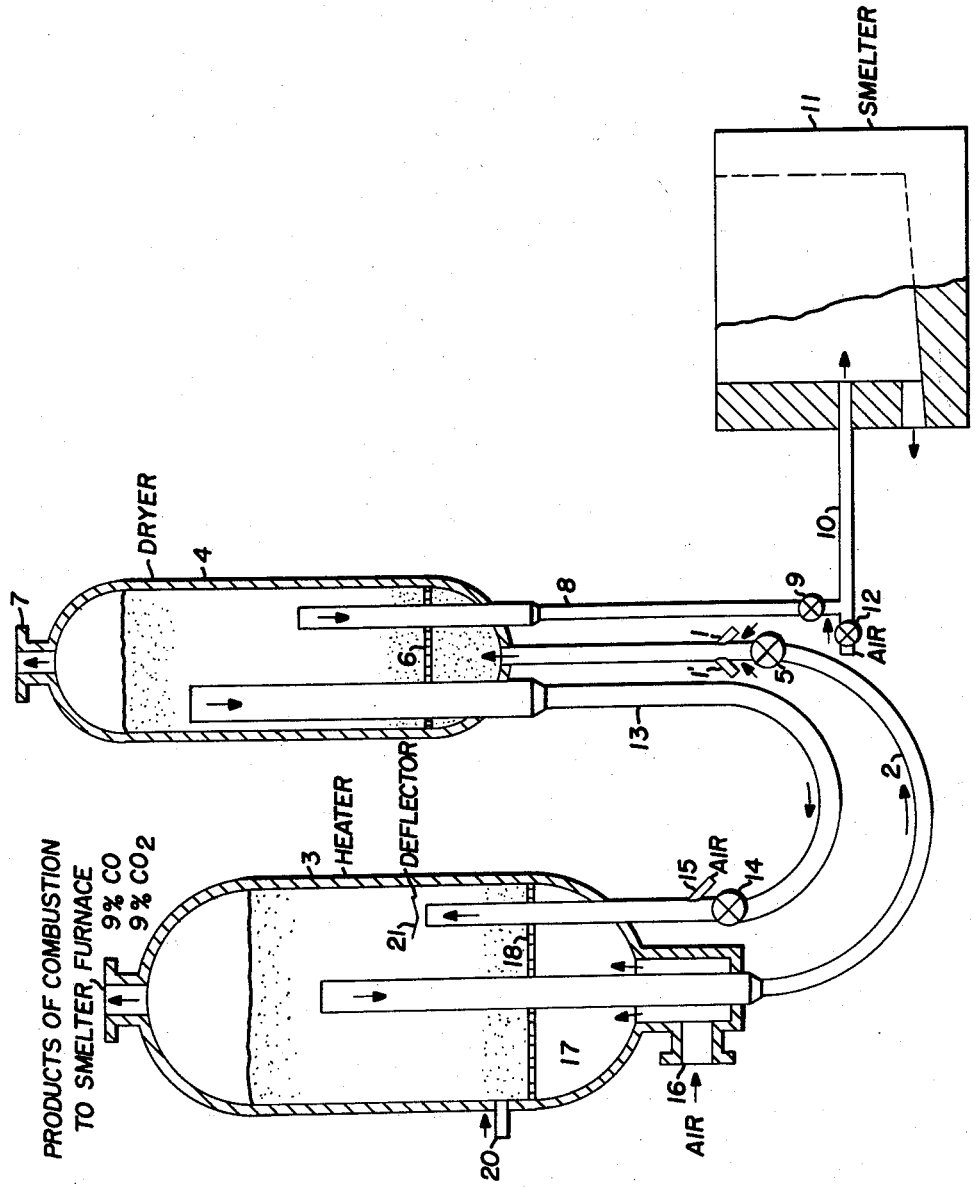
Harald E. Lonngren   Inventor
By  Henry Berk  Attorney

United States Patent Office 2,928,184
Patented Mar. 15, 1960

2,928,184

SULFATE LIQUOR RECOVERY PROCESS

Harald E. Lonngren, New York, N.Y., assignor to Esso Research and Engineering Company, a corporation of Delaware Application May 24, 1956, Serial No. 587,053

7 Claims. (Cl. 34—10)

This invention relates to the process of drying about 50% dry black liquor commonly obtained as spent cooking liquor from the sulfate process for the production of pulp wherein fluidized granulated black ash (dried black liquor) is used as carrier of the heat which is needed for the drying step proper.

It is a primary object of this invention to effect an expeditious drying of about 50% dry black liquor by contacting said liquor with a moving mass of heated granular black ash in a drying zone, as hereinafter fully explained, in which drying step the driven-off steam is withdrawn immediately following its liberation in said zone.

It is a second object of this invention to carry out burning of a portion of the combustible mass of said dried black liquor in a combustion zone, under such conditions of feed rate of dry black ash and combustion air into said zone, to accomplish heating of the remainder of the black ash feed without exceeding an upper temperature level of about 1100° F. in said zone.

It is a specific object of this invention to carry out a complete and self-sustaining black liquor drying process in a drying zone and a combustion zone, in which zones a fluidized bed of granular black ash is maintained and between which zones a portion of said black ash is continuously circulated in a fluidized state to perform the duty of drying the wet black liquor feed in the drying zone with heat which is derived from liberated heat in the combustion zone.

There are numerous ways of drying cellulose waste liquors prior to burning the sought for residue in the smelter. Generally, two distinct drying methods are used, namely:

(1) Driven-off steam co-mingles with the smelter gas mass.

(2) Driven-off steam is put to use.

Method No. 1 is used in the well known rotary kilns and also in the Tomlinson System. In method No. 2, again the drying step is presently effected either by using waste heat or superheated steam from the recovery unit, as such. The present invention falls in the method No. 2 class.

This invention relates therefore to the discovery that black liquor may be dried in an economical and novel manner by employing two stages or operations, each of which requires certain definite and critical process conditions and involving a specific fluidized solids technique wherein the process is self-sustaining, i.e. that no additional heat is required.

The first operation comprises heating in a heating zone previously dried black ash with heat which is derived solely from the combustibles of the black ash itself, and the second operation comprises utilizing the so obtained heat to drive off the moisture content of the black liquor feed in a drying zone, to secure a dry residue which lends itself for combustion in suspension in the smelter proper. One of the outstanding advantages of the present black liquor drying process resides in the production of a dry granular black ash, which is not sticky, but lends itself readily for transport with an elastic fluid. Prior art screw conveyor transport means are obviated. It has been found that a mass of fluidized dry black ash heated to about 1000°–1100° F. lends itself readily as carrier of the required drying heat and for transmitting the heat to the wet black liquor feed. The main reason for a resulting expeditious heat transfer resides in the large surface area which black ash possesses in a granular state. This method of supplying the required heat for the drying step represents an advance in the art because the common formation of a sticky char, as experienced in prior art drying methods, is entirely obviated in this process. It is pointed out that an important feature of the invention resides in the employment of dry black ash as carrier of the required process heat. In this manner no foreign heating substance or medium needs to be circulated through the system.

For a more complete description and understanding of the invention, reference is now had to the accompanying drawing. In the accompanying drawing, the sole figure represents diagrammatically and in vertical section one form of apparatus wherein the invention may be performed, and comprises essentially a vertical black ash heater equipped with a perforated transverse grid plate and having an inlet for the combustion air and an outlet for the products of combustion, a vertical black liquor dryer, also equipped with a transverse perforated grid plate, and having an outlet for the driven-off steam, interconnecting piping for the transport of dry black ash between the two vessels in accordance with the fluidized solids technique, a conduit from the drying vessel to the smelter furnace for the transport of dried substance to the smelter. Substantially as shown, all of which features and others will more clearly appear from the following clearly detailed description.

Referring in detail to the drawing, a previously heated black liquor feed having a moisture content of about 50–55% and an elevated temperature, preferably about 200–220° F., is introduced into the system through nozzles 1 and 1' disposed as shown in the wall of pipe 2 through which hot black ash is conveyed from the heater 3 into the dryer 4. The mass-flow is controlled with a valve 5 so that about 5 to 10 lbs. of black ash having a temperature not substantially above 1100° F. comes in contact with each pound of the black liquor feed. The contact brings about an instantaneous vaporization of the moisture content of the black liquor feed and the formed steam in turn changes the density of the black ash mass to furnish the propelling force in the manner well known in the fluidized solids technique. The upward mass flow into the dryer 4 is passed through a perforated grid plate 6 so as to facilitate establishing in the dryer a fluidized bed wherein the black ash particles can fall back while the formed steam travels therethrough and finally disengages at a certain level in the dryer for withdrawal through nozzle 7 at the top. The temperature of the steam is about 250° to 300° F. Dried substance is withdrawn from the dryer 4 through a vertical pipe 8 having a control valve 9. Conveyance through pipe 10 into the smelter 11 is by means of compressed air which is supplied from any source with a valve 12. The heat which is required for the drying step described above, is supplied by burning of combustibles of the dry black ash in the heater 3. Dry black ash is conveyed into the heater 3 from the dryer 4 through pipe 13 having a control valve 14. The propelling force is supplied by a change of density of the black ash mass, which is brought about by supplying compressed air through nozzle 15 in the pipe 13, as shown, and as well known in the fluidized solids technique. Air for combustion is introduced through nozzle 16 wherefrom it is passed into the lower end portion 17 of the heater and thence through a perforated grid plate 18 for even distribution in the interior of the heater proper. A fluidized bed is thus created in this space while the oxygen in the air unites with the carbon in the black ash. The combustion is controlled in such a way that a maximum temperature level of about 1100° F. is not exceeded. The ensuing products of combustion are withdrawn into the smelter furnace (conduit not shown) for burning of formed carbon monoxide. The heater temperature may be controlled by injection of wet black liquor through nozzle 20. Plate 21 deflects the discharge mass from pipe 13.

Vessels 3 and 4 comprise elongated vertical cylinders or drums having hemispherical end portions. These vessels are filled with dry black ash in amounts such that the level in each vessel will coincide with the junction line between the straight shell and the end portion when a fluidized state exists in the vessels. The level height in the heater 3 is about 15 to 20 feet above the grid plate 18. The diameter of this vessel is chosen so as to give a vapor velocity of about 1.5 to 2.5 feet per second in the vessel. With these physical dimensions ample time of residence is provided in the vessel for a controlled burning of the combustibles at a maximum temperature level of about 1100° F. and for the formation of about 9 percent carbon monoxide and 9 percent carbon dioxide in the ensuing gas mass without exceeding heat liberation rates of about 15,000 to 20,000 B.t.u. per cu. ft. per hour which represents preferred conditions of operation in the vessel 3, while maintaining a vapor pressure of about 2 to 5 lbs. per sq. in. in said vessel.

The dryer 4 has a diameter such that the formed steam will disengage from the fluid bed therein at a velocity of about .75 to 1.5 feet per second so as to prevent entrainment of dried material. The fluidized bed level is about 10 to 15 feet above the grid plate 6 so as to guard against eventual channeling through of steam. The steam pressure in the dryer 4 is maintained at a level approximately 1 lb. per sq. in. less than the pressure in the heater 3. For this reason, it is necessary to establish the actual elevation of the fluid bed level in relation to the fluid bed level in the heater 3 on the basis that the said pressure differential is restored by a higher disposition of the dryer bed level in accordance with the well-known fact in the fluidized solids technique that a vertical column of minute particles causes a pressure to exist at its bottom in the same manner as a water column does.

A fully controllable transport of dry black ash between the heater 3 and the dryer 4 and out from the dryer to the smelter furnace is accomplished with a piping arrangement substantially as shown. The flow through pipe 13 into the heater, wherein the prevailing pressure is about 1 lb. per sq. in. higher than in the dryer, takes place readily because the pipe 13 extends vertically upward in the dryer to form a standpipe, wherein a dense mass is permitted to prevail, thus setting up a pressure in the lower portion of said pipe, which pressure is somewhat higher than the prevailing pressure at or in the discharge zone in the heater.

It will thus be readily perceived that the improvements in the art of producing a dry easily flowing powder from a 50 percent dry black liquor feed in accordance with the objects set forth are fully attained with the described arrangement. It may be pointed out that it is preferable to inject the wet black liquor feed through nozzles 1 and 1' at an angle of approximately 30° from the vertical as indicated in the drawing. Said nozzles must be fitted to the pipe so that they do not protrude into the pipe. While the ensuing black liquor jets may have a common point of interjection within the pipe, it has been found that good vaporization results are also obtained when said jets emanate obliquely in relation to each other, so as to cause a whirling motion of the hot black ash mass, into which they are injected.

It will, of course, be understood that numerous modifications of the invention may be made without departing from the spirit thereof and that the invention is not limited to the precise details given in this specification, but is to be construed as broadly as the appended claims will permit.

What is claimed is:

1. A process of drying black liquor which comprises providing a drying zone having a fluidized bed of dry black ash therein, continuously feeding dry black ash at a temperature between 1000° and 1100° F. to the bottom of said bed, continuously supplying black liquor feed containing about 50–55% solids and at an elevated temperature into the bottom of said bed, passing the liquor and dry black ash concurrently upward through the drying zone, wherein the heat in said dry black ash acts to dry the black liquor into a granular substance and the driven off steam acts as a fluidization agent, removing driven off steam from the drying zone, removing a first portion of dried black liquor as product from said drying zone, removing a second portion of dried black liquor from said drying zone, continuously passing said second portion of dried black liquor into a heating zone, having a fluidized bed of said dried black liquor therein, combusting dried black liquor in said heating zone at a temperature of not substantially above 1100° F., the heat of the combustion heating the unburned black ash, and the combustion air and the vaporous products of combustion acting as fluidization agents in said zone, removing products of combustion from said heating zone, and recycling heated dry black ash from said heating zone to said drying zone as the dry black ash feed thereinto.

2. A method in accordance with claim 1 wherein said black liquor feed is supplied at a temperature between about 200°–220° F. and the temperature within said heating zone is maintained at about 1100° F.

3. A method in accordance with claim 2 wherein the temperature within said heating zone is controlled by introducing black liquor therein.

4. A process of drying black liquor obtained from a sulfate pulping process which comprises partially burning dried black ash at a temperature not substantially above 1100° F. in a heating zone wherein said black ash is maintained in a fluidized state by gases comprising the products of combustion, withdrawing hot dry black ash from said heating zone and immediately admixing said hot black ash with black liquor containing about 50–55% solids, thereby causing vaporization of the moisture content of said black liquor and forming additional black ash, passing the total black ash into a drying zone wherein said black ash is maintained in a fluidized state by gases comprising the steam formed in the vaporization of said black liquor, recycling a portion of the dried black ash into said heating zone for partial combustion and continuously withdrawing dried black ash product from said drying zone.

5. A method in accordance with claim 4 wherein the temperature of the black ash within said heating zone is maintained between about 1000–1100° F.

6. A method in accordance with claim 4 wherein said hot black ash is admixed with the black liquor by injecting said black liquor into a fluidized stream of hot black ash at an angle of about 30° from the vertical, the black liquor being injected in a generally downstream direction.

7. A process of drying waste liquor obtained in the production of pulp which comprises providing a drying zone having a fluidized bed of dry ash therein, continuously feeding dry ash at a drying temperature of not substantially above 1100° F. to the bottom of said bed, continuously supplying waste liquor feed containing solids and at an elevated temperature into the bottom of said bed, passing the liquor and dry ash concurrently upward through the drying zone, wherein the heat in said dry ash acts to dry the liquor into a granular substance and the driven off steam acts as a fluidization agent, removing a first portion of driven off steam from the drying zone, removing dried liquor from said drying zone as product, removing a second portion of dried liquor from said drying zone, continuously passing said second portion of dried liquor into a heating zone, having a fluidized bed of said material therein, combusting the dried liquor in said heating zone at a temperature above said drying temperature, the heat of the combustion heating the unburned ash, and the combustion air and the vaporous products of combustion acting as fluidization agents in said zone, removing products of combustion from the heating zone, and recycling heated dry ash from said heating zone to said drying zone as the dry ash feed thereinto.

References Cited in the file of this patent

UNITED STATES PATENTS

| | | |
|---|---|---|
| 2,406,581 | Bergstrom et al. | Aug. 27, 1946 |
| 2,568,239 | Lonngren | Sept. 18, 1951 |
| 2,712,495 | Clarke | July 5, 1955 |
| 2,735,743 | Rax | Feb. 21, 1956 |
| 2,735,806 | Molstedt et al. | Feb. 21, 1956 |